United States Patent Office 3,209,367
Patented Sept. 28, 1965

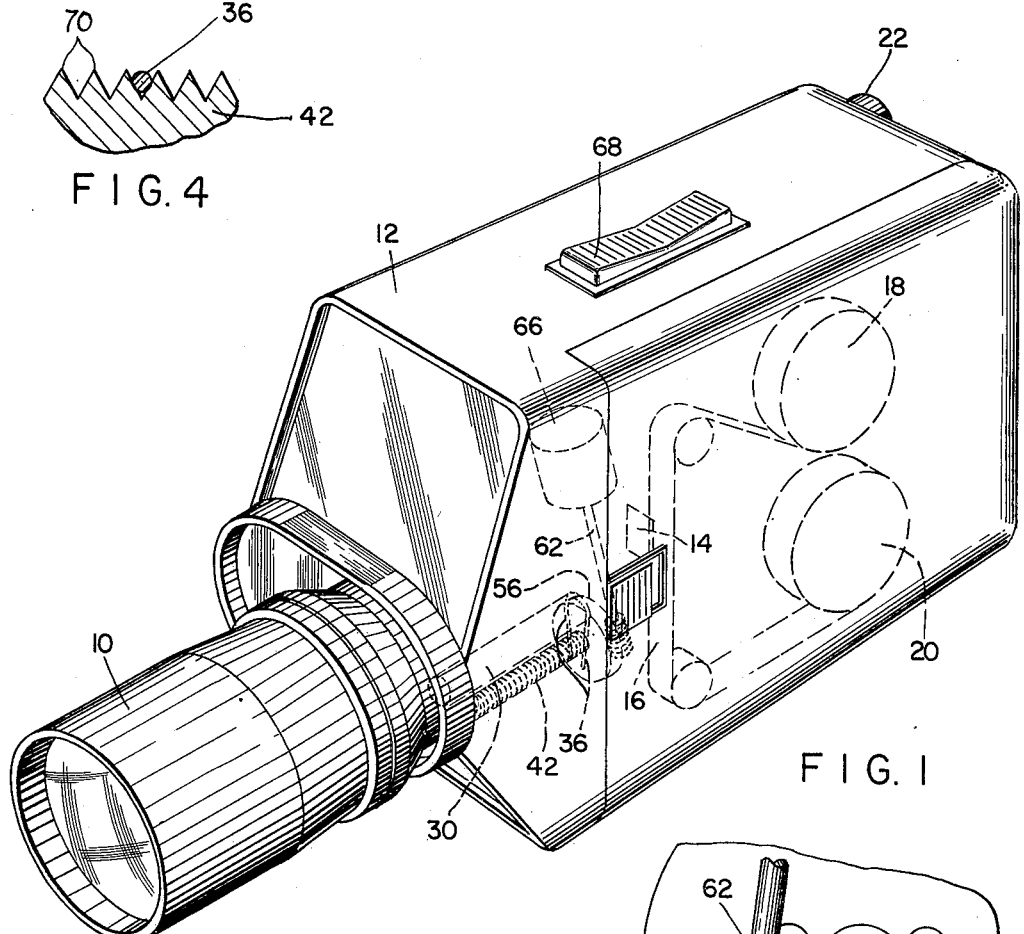

3,209,367
LENS DRIVE MECHANISM
Axel M. Heden, Quincy, Mass., assignor to Keystone Camera Company, Inc., Boston, Mass., a corporation of Massachusetts
Filed Sept. 25, 1962, Ser. No. 225,996
10 Claims. (Cl. 352—140)

This invention relates to cameras and more particularly to an improved mechanism for adjusting the position of a camera lens assembly of the zoom type.

In motion picture cameras the ability to take photographs employing either wide angle or telephoto lens arrangements is a feature of importance. With the development of the "zoom" type of optical unit a single lens unit is provided which is continuously adjustable between the wide angle and the telephoto lens positions so that a zoom effect can be achieved. While a number of hand actuated and power operated lens adjusting mechanisms are available, it is desirable under certain circumstances to have the ability to move the lens at a controlled and constant rate, to move the lens manually, and also to secure the lens while movement is not desired so that a rapid movement of the camera, as in panning, does not produce an unwanted change in the position of the relatively heavy zoom lens unit.

Accordingly, it is an object of this invention to provide an improved mechanism for automatically adjusting a zoom lens assembly.

Another object of the invention is to provide an improved zoom lens power adjustment mechanism which embodies a positive lens positioning arrangement that permits overriding manual movement of the lens unit when desired.

Another object of the invention is to provide an improved zoom lens power drive coupling in which the drive coupling at the end of travel of the zoom lens while remaining in overriding engagement is not subject to jamming action so that a reverse operation may be initiated immediately.

A further object of the invention is to provide a novel and improved zoom lens assembly drive mechanism in which the driving member and zoom lens assembly are continually engaged so that an immediate movement of the lens assembly in either desired direction results when the drive mechanism is operated.

Still another object of the invention is to provide a novel and improved zoom lens assembly drive mechanism which produces an audible sound at the limit of drive in either direction as an indication to the operator that such limit has been reached.

A further object of the invention is to provide a novel and improved zoom lens assembly drive mechanism of the continuously engaged type that requires less power in operation than drives employing friction clutches and similar types of devices.

In accordance with the invention there is provided a motion picture camera having a zoom lens assembly including a first lens assembly that is movable toward and away from a fixed second lens assembly between a wide angle position and a telephoto position. A helically grooved shaft is mounted for rotation about an axis parallel to the axis of movement of the lens unit. A resilient rod extends generally perpendicularly to that axis and engages the groove in the shaft such that it is normally biased into engagement with the walls of the groove. However, the biasing force is of a magnitude such that manual pressure on the zoom lens unit will cause the first lens assembly to move and the resilient rod to ride up out of the groove and be moved along the shaft across the groove ridges with a clicking sound that provides an audible indication of the manual lens adjustment. Under power operation the grooved shaft is rotated and the resilient rod remains in the groove and is driven along the axial length of the shaft to move the zoom lens assembly between the telephoto position and the wide angle position. At either position of maximum lens movement the resilient rod remains in engagement with the helical groove but the rod is urged axially and rides up out of the groove in an effective decoupling action under continued rotation of the grooved shaft. This action also produces an audible clicking sound as a signal to the operator that the zoom lens is at the end of its travel. Further, the coupling, although overridden, remains effective upon reversal of shaft rotation direction to immediately move the first lens assembly in the opposite direction. The invention thus provides a simple assembly which permits controlled reliable adjustment of the zoom lens mechanism and assures positive lens positioning without a jamming or complete decoupling at the end of travel and further permitting manual adjustment of the zoom lens if desired. The assembly is a compact arrangement of components whose power requirements are substantially less than friction clutch arrangements or similar types of devices.

Other objects, features and advantages of the invention will be seen as the following description of a preferred embodiment thereof progresses, in conjunction with the drawings, in which:

FIG. 1 is a perspective view of a motion picture camera incorporating a zoom lens actuating mechanism constructed in accordance with the invention;

FIG. 2 is a side elevational view of the zoom lens adjusting mechanism employed in the camera shown in FIG. 1;

FIG. 3 is an end view of the zoom lens adjusting mechanism shown in FIG. 2; and

FIG. 4 is an enlarged view showing the relation of the resilient rod to the helically grooved shaft in the zoom lens adjusting mechanism.

With reference to FIG. 1, there is shown in perspective view a motion picture camera having a lens assembly 10 mounted in front of a case 12. This lens assembly includes a lens component movable relative to a second fixed lens component between a wide angle lens position and a telephoto lens position. Aligned with the optical axis of the lens system is an exposure aperture structure indicated diagrammatically at 14 behind which a photosensitive surface such as film 16 is disposed. The film 16 is moved from a supply reel 18 to a takeup reel 20. In the camera shown in this embodiment a through lens viewing arrangement is employed whereby a portion of the light passing through the main lens system is directed through an offset optical path to an eye piece 22 shown at the rear of the camera case. Additional features of this coupled viewfinder and movable lens system are disclosed in the copending application, Serial No. 181,101, entitled Improvements in Camera Control Arrangements, filed on March 20, 1962, in the name of Robert E. French and assigned to the assignee of this application.

A link 30 is connected to a structural element 32 of the movable lens component as shown in FIGS. 2 and 3. At the end of the link 30 remote from the lens unit two recesses 34 are formed in which are seated two resilient rods 36. These rods may be separate components or a single U-shaped spring having two parallel rod portions, for example. The rods are secured in position by a washer 38 and a screw 40 which is threaded into the link 30 to secure the rods 36 in the recesses with the major portions of the rods extending downwardly below the link 30. If desired, the coupling between the rods 36 and link 30 rather than being rigid may be somewhat resilient as by the use of a dished spring washer, for example.

The depending portions of the rods engage a grooved shaft 42, one end of which is supported by the fixed lens support 44 for rotation in a bearing structure 46. A bracket 48 secured to the camera casing 50 by screws 52 carries a bearing member 54 in its rear end which supports the corresponding end of shaft 42 so that that shaft is free to rotate in those bearing members. Spring washers or similar devices may be used to enable limited axial movement of shaft 42 under resilient control. Mounted forward of and immediately adjacent bearing member 54 is a worm gear 56 which is secured in driving relation to the shaft 42 by a press fit for rotation therewith.

Also supported from the bracket 48 is an offset seat 60 on which the end of a shaft 62 is seated. Mounted on shaft 62 is a worm 64 in position for driving engagement with worm gear 56. Shaft 62 is connected to a small reversible electric drive motor 66 which is powered by a battery carried within the camera case 12. The electric circuit for this motor is controlled by switch 68 and enables forward and reverse operation thereof. If desired, in an alternative arrangement, for example, the main film drive mechanism may be connected through an appropriate power train to rotate the shaft 42 to provide the desired forward and reverse movement of the zoom lens assembly.

The rods 36 are disposed on either side of the threaded shaft under slight biasing force so that they are seated firmly within the helical groove. In the preferred embodiment these wires are .014 inch diameter music wire and are secured in the movable link 30 in two recesses, spaced 0.100″ apart. The grooved shaft has a standard machine screws 5–40 N.C. 2 thread so that its outer diameter of the shaft 42 is .125 inch and there is approximately 0.025″ between adjacent crests 70 of the grooves. Thus each rod 36 is seated against the inclined sides of the groove in firm and positive engagement therewith as shown in FIG. 4 and is forced outwardly from the .100″ spacing between the securing recesses in the link 30. It is desirable to leave a small threaded extension 72 on the shaft beyond the end of normal travel of the rods 36 so that a clicking noise, produced as the coupling rods ride out of the grooves at the end of the travel, provides an audible indication that the full extent of travel by the zoom lens has been accomplished by the power drive.

In operation, switch button 68 is depressed to energize the motor 66 for rotation in a selected direction and this rotation is coupled through the gear train to the helically grooved shaft 42. The rods 36 remain in the grooves as the shaft is rotated and are driven axially to move lens assembly 32 in a direction parallel to the axis of the grooved shaft 42. As indicated above, the shaft has threaded portions which extend beyond the limits of travel of the lens assembly 32 and when the rods 36 reach that position they will be biased in an axial direction as indicated in FIG. 2 and tend to ride out of the grooves without imposing an excess load on shaft 42. As the rods 36 ride out of the grooves a clicking noise is produced which provides an audible indication to the operator that the lens assembly has in fact been moved to full telephoto or wide angle position, depending on the selected drive direction. The coupling force supplied by the rods 36 in engagement with the threaded shaft 42 is designated so that the total spring forces are at least slightly greater than that necessary to produce zoom action when the camera is pointed straight up or straight down and the lens being driven against gravity so that the desired controlled zoom lens assembly movement is insured. This drive arrangement also permits manual adjustment of the zoom lens if desired in which manual pressure applied to the zoom lens assembly is sufficient to overcome the coupling force of the rods 36 with the shaft 42 so that the lens assembly may be moved with accompanying movement of the rods along the shaft 42 which also produces a slight clicking noise, an audible indication that the zoom lens unit is being manually adjusted.

By means of the through lens viewing arrangement, the viewfinder is directly coupled to the position of the movable zoom lens unit so that exactly the same view to which the camera is exposed is seen in the viewfinder. In alternative arrangements well known in the art a separate viewfinding lens system may be employed. The two lens systems may be coupled together and driven by the adjusting mechanism of the invention to provide a view corresponding to the setting of the zoom lens unit.

Thus it will be seen that the invention provides a simple, economical and reliable zoom lens adjusting mechanism which provides adjustment as desired under power control in a continuously engaged positive drive arrangement in which there is no tendency to jam at either extreme of travel and which further permits manual override of the drive mechanism. The drive mechanism is positively engaged during lens movement under power so that available energy is efficiently employed. While a preferred embodiment of the invention has been shown and described various modifications thereof will be obvious to those skilled in the art and therefore it is not intended that the invention be limited to the disclosed embodiment or to details thereof and departures may be made therefrom within the spirit and scope of the invention as defined in the claims.

I claim:
1. In a camera of the type having a housing,
   means defining an exposure aperture,
   a photosensitive surface disposed behind said exposure aperture,
   control means operable from the exterior of said housing for controlling the recording of images by said photosensitive surface,
   and a lens assembly disposed in light transmitting relation in front of said aperture,
   said lens assembly having at least one fixed lens and one movable lens and said lenses being aligned to define an optical axis along which said movable lens is movable toward and away from said fixed lens,
   a movable lens drive mechanism comprising a rotatable shaft mounted parallel to said optical axis and having a helical groove therein,
   coupling means attached to said movable lens and having a portion extending in a substantially perpendicular direction past said rotatable shaft, said portion being resiliently biased inwardly towards said shaft for engagement with said helical groove in seating relation,
   reversible drive means for rotating said shaft in either direction,
   and means connecting said drive mechanism between said camera housing and said movable lens so that the operation of said drive means adjusts the position of said movable lens relative to said fixed lens.

2. The drive mechanism as claimed in claim 1 wherein said coupling means includes a movable link disposed parallel to said optical axis,
   and said portion includes a resilient rod fixedly secured to said movable link.

3. The drive mechanism as claimed in claim 1 wherein the axial length of said helical groove in said rotatable shaft is greater than the permitted axial movement of said movable lens along said optical axis, and said coupling means, while remaining in engagement with said rotatable shaft at all times, rides up out of said groove at the end of said rotatable shaft.

4. In a camera of the type having a housing,
   means defining an exposure aperture,
   a photosensitive surface disposed behind said exposure aperture,
   control means operable from the exterior of said housing for controlling the recording of images by said photosensitive surface,
   and a lens assembly disposed in light transmitting relation in front of said aperture,
   said lens assembly having at least one fixed lens and one movable lens and said lenses being aligned to define an optical axis along which said movable lens is movable toward and away from said fixed lens, a movable lens drive mechanism comprising a rotatable shaft mounted parallel to said optical axis and having a helical groove therein, a movable link disposed parallel to said optical axis and connected to said movable lens, a pair of spaced resilient rods fixedly secured to said movable link and disposed perpendicular to said optical axis for seating engagement with said helical groove on opposite sides of said rotatable shaft, reversible drive means for rotating said shaft in either direction, and means connecting said drive mechanism between said camera housing and said movable lens so that the operation of said drive means adjusts the position of said movable lens relative to said fixed lens.

5. The drive mechanism as claimed in claim 4 wherein the axial length of said helical groove in said rotatable shaft is greater than the permitted axial movement of said movable lens along said optical axis so that said resilient rods remain in engagement with said rotatable shaft at all times.

6. A motion picture camera of the type having a housing, means defining an exposure aperture, means including a film spool for passing a photographic film progressively past said exposure aperture in a picture taking operation, control means manually operable from the exterior of said housing for controlling the advance of film past said exposure aperture, a photographic lens assembly disposed in light transmitting relation to said aperture, said assembly having at least one fixed lens and one movable lens, said lenses being aligned to define an optical axis with said movable lens being movable in either direction along said axis relative to said fixed lens, a rotatable shaft mounted on said housing parallel to said optical axis and having a helical groove therein, a resilient rod having an end portion extending in a substantially perpendicular direction past said rotatable shaft, said end portion being biased inwardly towards said shaft for engagement with said helical groove in seating relation, means connecting said resilient rod to said movable lens, said resilient rod and said rotatable shaft providing a coupling between said camera housing and said movable lens, and reversible shaft drive means for rotating said shaft in either direction to move said movable lens relative to said fixed lens through the coupling of said shaft and said resilient rod.

7. The apparatus as claimed in claim 6 wherein said helical groove is of V-shaped configuration with inclined walls and spacing between adjacent crests greater than the diameter of said rod so that the rod is normally seated in said grooves in contact with both inclined surfaces.

8. The apparatus as claimed in claim 6 and further including reversible electric motor drive means coupled to said shaft for rotating said shaft in either direction and control means mounted externally of said housing for controlling the operation of said drive motor.

9. A motion picture camera of the type having a housing, means defining an exposure aperture, means including a film spool for passing a photographic film progressively past said exposure aperture in a picture taking operation, control means manually operable from the exterior of said housing for controlling the advance of film past said exposure aperture, a photographic lens assembly disposed in light transmitting relation to said aperature, said assembly having at least one fixed lens and one movable lens, said lenses being aligned to define an optical axis with said movable lens being movable in either direction along said axis relative to said fixed lens, a rotatable shaft mounted parallel to said optical axis and having a helical groove therein, two resilient rods disposed perpendicular to said optical axis, said rods having end portions biased into engagement with said helical groove in said shaft on opposite sides thereof, said resilient rods and said rotatable shaft providing a coupling between said camera housing and said movable lens, and reversible shaft drive means for rotating said shaft in either direction to move said movable lens relative to said fixed lens through the coupling of said shaft and said resilient rods.

10. The apparatus as claimed in claim 9 wherein the axial length of said helical groove in said rotatable shaft is greater than the permitted axial movement of said movable lens along said optical axis so that said resilient rods remain in engagement with said rotatable shaft at all times.

References Cited by the Examiner

UNITED STATES PATENTS

| 1,755,105 | 4/30 | Douglass. |
| 1,950,166 | 3/34 | Durholz. |
| 2,724,988 | 11/55 | Peters _____ 88—24 X |

FOREIGN PATENTS 860,741   2/61   Great Britain.

NORTON ANSHER, *Primary Examiner.*

WILLIAM MISIEK, *Examiner.*